United States Patent
Zhao

(10) Patent No.: US 12,289,701 B2
(45) Date of Patent: Apr. 29, 2025

(54) METHOD AND DEVICE FOR TRANSMISSION TIME ADJUSTMENT AND CONFIGURATION

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 630 days.

(21) Appl. No.: 17/614,449

(22) PCT Filed: May 28, 2019

(86) PCT No.: PCT/CN2019/088758
§ 371 (c)(1),
(2) Date: Nov. 26, 2021

(87) PCT Pub. No.: WO2020/237496
PCT Pub. Date: Dec. 3, 2020

(65) Prior Publication Data
US 2022/0240209 A1   Jul. 28, 2022

(51) Int. Cl.
H04W 56/00    (2009.01)
H04W 72/25    (2023.01)

(52) U.S. Cl.
CPC ..... *H04W 56/0045* (2013.01); *H04W 56/001* (2013.01); *H04W 56/006* (2013.01); *H04W 72/25* (2023.01)

(58) Field of Classification Search
CPC ........... H04W 56/0045; H04W 56/001; H04W 56/006; H04W 76/14; H04W 76/40
See application file for complete search history.

(56) References Cited

U.S. PATENT DOCUMENTS

| | | | |
|---|---|---|---|
| 11,695,531 B2* | 7/2023 | Khoryaev | H04L 5/0055 370/330 |
| 2020/0022089 A1* | 1/2020 | Guo | H04W 52/242 |
| 2020/0037343 A1* | 1/2020 | He | H04W 28/0268 |
| 2020/0196255 A1* | 6/2020 | Cheng | H04L 5/0092 |
| 2020/0220694 A1* | 7/2020 | Khoryaev | H04W 28/04 |
| 2020/0228247 A1* | 7/2020 | Guo | H04L 1/0025 |
| 2020/0288286 A1* | 9/2020 | Hwang | H04L 27/2607 |
| 2020/0336253 A1* | 10/2020 | He | H04W 76/11 |
| 2020/0351033 A1* | 11/2020 | Ryu | H04L 1/1861 |

(Continued)

FOREIGN PATENT DOCUMENTS

| | | |
|---|---|---|
| EP | 2568755 B1 | 7/2014 |
| EP | 3860235 A | 8/2021 |
| WO | WO 2017049521 A1 | 3/2017 |

OTHER PUBLICATIONS

European Patent Application No. 19931136.6, Search and Opinion dated Apr. 28, 2022; 7 pages.

(Continued)

*Primary Examiner* — Redentor Pasia
(74) *Attorney, Agent, or Firm* — Cozen O'Connor

(57) ABSTRACT

A method for adjusting transmission time, applied to any one of receiving ends in a sidelink multicast communication, includes starting transmitting a physical sidelink feedback channel at a first timing before a synchronization reference timing and separated from the synchronization reference timing by a first time offset.

18 Claims, 10 Drawing Sheets determine a second time offset between a second timing that a sidelink signal transmitted by the transmitting end is received and the synchronization reference timing — 101-11 determine the first time offset based on the second time offset — 101-12

(56) References Cited

U.S. PATENT DOCUMENTS

| | | | | |
|---|---|---|---|---|
| 2020/0359375 A1* | 11/2020 | Hwang | ................ | H04L 1/1854 |
| 2021/0126744 A1* | 4/2021 | Hwang | ................ | H04L 1/1819 |
| 2021/0219268 A1* | 7/2021 | Li | ........................ | H04W 72/20 |
| 2021/0297221 A1* | 9/2021 | Lee | ....................... | H04L 5/0091 |
| 2021/0314933 A1* | 10/2021 | Zhang | .................. | H04W 72/20 |
| 2021/0360725 A1* | 11/2021 | Tang | ..................... | H04W 24/04 |
| 2022/0007403 A1* | 1/2022 | Li | ........................ | H04W 72/20 |
| 2022/0094481 A1* | 3/2022 | Hong | ................... | H04L 1/1812 |
| 2022/0116996 A1* | 4/2022 | Lee | .................. | H04W 74/0816 |
| 2022/0174655 A1* | 6/2022 | Tsai | ..................... | H04W 72/20 |
| 2022/0201654 A1* | 6/2022 | Lee | ....................... | H04W 72/20 |

OTHER PUBLICATIONS

Intel Corporation "Physical layer procedures for NR V2X sidelink communication" 3GPP TSG RAN WG1 Meeting #97; R1-1906799; May 2019; 14 pages.

Indian Patent Application No. 202147060677, Office Action dated May 20, 2022, 5 pages.

* cited by examiner

METHOD AND DEVICE FOR TRANSMISSION TIME ADJUSTMENT AND CONFIGURATION

CROSS-REFERENCE TO RELATED APPLICATION

This application is a national phase of International Application No. PCT/CN2019/088758, filed on May 28, 2019, the content of which is hereby incorporated by reference in its entirety.

TECHNICAL FIELD

The disclosure relates to a field of communications, and more particularly to a method and a device for adjusting and configuring transmission time in a sidelink multicast communication system.

BACKGROUND

At present, V2x (Vehicle to everything of Internet of Vehicles) communication includes V2V (Vehicle to Vehicle between vehicle-mounted devices) communication, V2I (Vehicle to Infrastructure between a vehicle-mounted device and a roadside device) communication, and V2P (Vehicle to Phone between a vehicle-mounted device and a handheld device). The Internet of Vehicles can effectively improve traffic safety, improve traffic efficiency, and enrich people's travel experience.

SUMMARY

In one embodiment, a method for adjusting transmission time is provided. The method is applied to any one of receiving ends in a sidelink multicast communication. The Method Includes:
  starting transmitting a physical sidelink feedback channel at a first timing before a synchronization reference timing and separated from the synchronization reference timing by a first time offset.

In one embodiment, a non-transitory computer-readable storage medium is provided. The storage medium has computer programs stored thereon, and the computer programs are configured to execute a method for adjusting transmission time described above.

In one embodiment, there is provided a device for adjusting transmission time. The device is used for any one of receiving ends in a sidelink multicast communication. The device includes:
  A processor; and
  a memory, for storing instructions executable by the processor;
  in which, the processor is configured to:
  start transmitting a physical sidelink feedback channel at a first timing before a synchronization reference timing and separated from the synchronization reference timing by a first time offset.

It is to be understood that the above general description and the following detailed description are only exemplary and explanatory, and cannot limit the disclosure.

BRIEF DESCRIPTION OF THE DRAWINGS

The drawings here are incorporated into the specification and constitute a part of the specification, show embodiments consistent with the disclosure, and serve to explain the principle of the disclosure together with the specification.

DETAILED DESCRIPTION

Here, example embodiments will be described in detail, and examples thereof are shown in the accompanying drawings. When the following description refers to the drawings, unless otherwise indicated, the same numbers in different drawings indicate the same or similar elements. The implementation manners described in the following example embodiments do not represent all implementation manners consistent with the disclosure. On the contrary, they are merely examples of devices and methods consistent with some aspects of the disclosure as detailed in the appended claims.

The terms used in the disclosure are only for the purpose of describing specific embodiments and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It is to be understood that although the terms "first", "second", "third", etc. may be used in this disclosure to describe various information, the information should not be limited to these terms. These terms are only used to distinguish the same type of information from each other. For example, without departing from the scope of the disclosure, the first information may also be referred to as second information, and similarly, the second information may also be referred to as first information. Depending on the context, the word "if" as used herein can be interpreted as "when" or "when" or "in response to determining that."

In multicast communication supported by NR (New Radio) V2x, any one of following feedback modes can be adopted for a receiving end to feed back HARQ (Hybrid Automatic Repeat reQuest) result for received multicast data.

In a first feedback mode, each receiving end in a multicast packet sends the HARQ result to a transmitting end through the same resource only when the HARQ result indicates that the multicast data is not successfully received, that is, the HARQ result is a NACK (Negative-Acknowledgment).

Figure 1A:
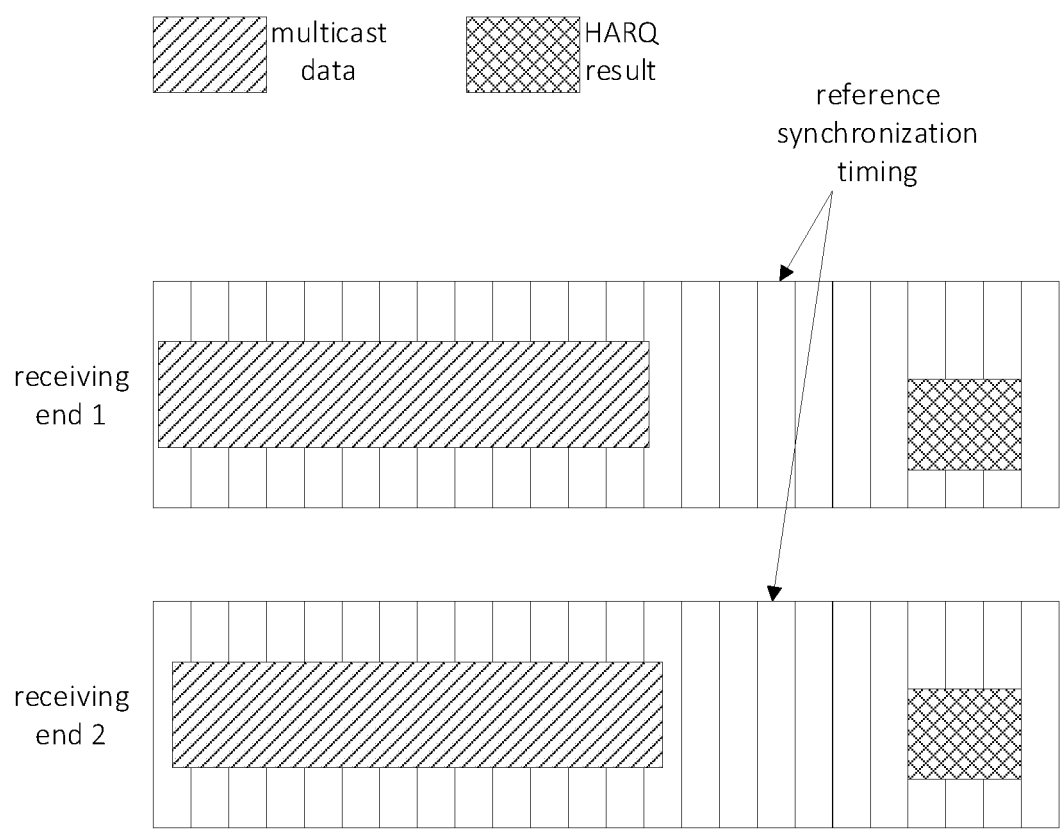
FIGS. 1A and 1B are schematic diagrams illustrating scenarios where the receiving ends feed HARQ results back in related arts.

All the receiving ends in the multicast packet synchronously send the HARQ results through the same resource based on a synchronization reference timing, for example, as illustrated in FIG. 1A.

Considering that the receiving end devices in the multicast packet may be distributed within a wide area, for example, within a range of a preset distance value centered on the transmitting end (the preset distance value depends on the communication distance of the V2x communication), distances between different receiving ends and the transmitting end may be different.

Figure 1B:
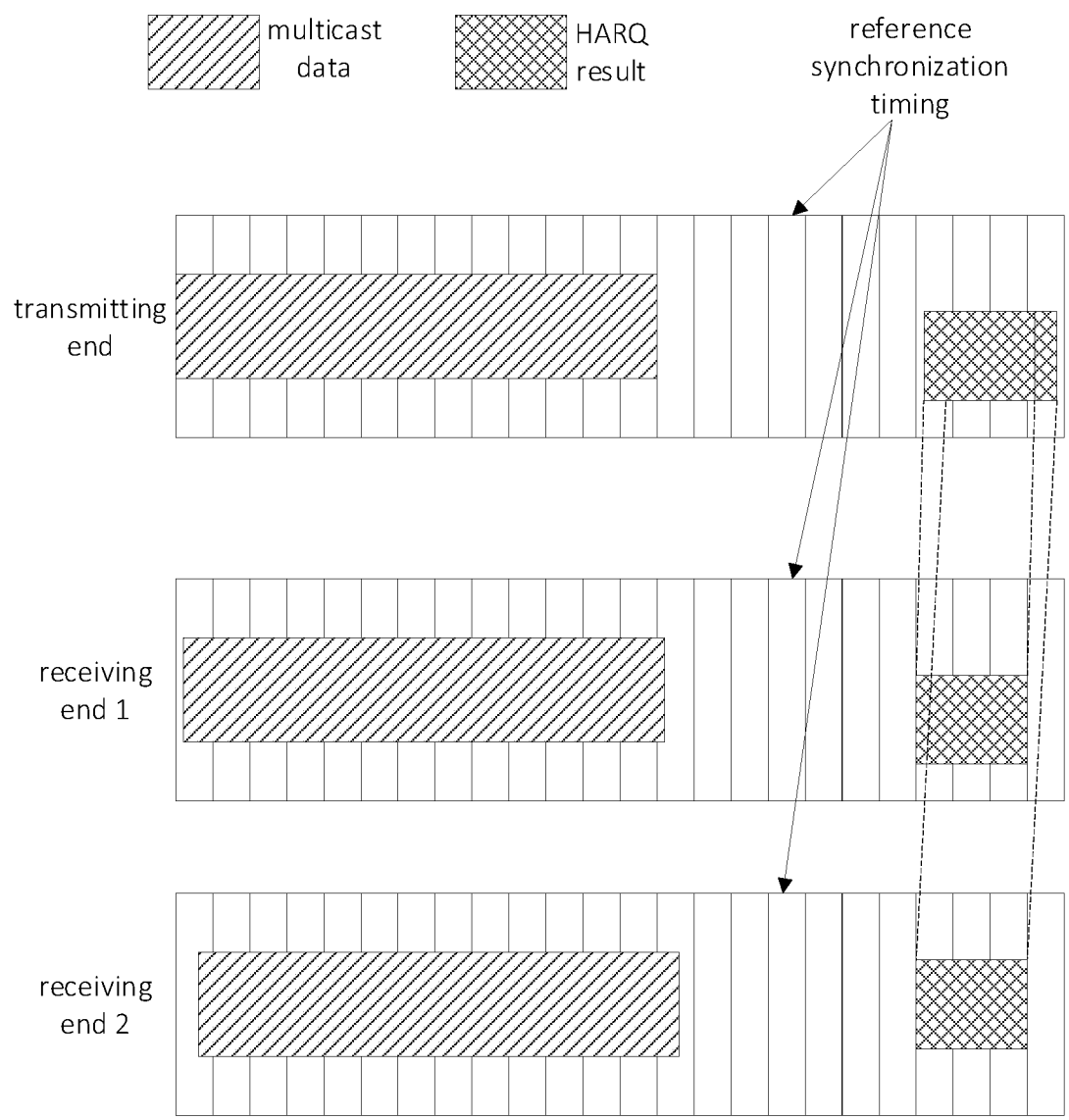

Due to the different distances between the receiving ends and the transmitting end, different communication delays are caused and the HARQ results sent by the receiving ends reach the transmitting end at different times, for example, as illustrated in FIG. 1B.

The transmitting ends receives the HARQ results sent by multiple receiving ends in the same resource. The delays corresponding to different HARQ results may cancel out each other due to phase rotation, such that the transmitting end cannot correctly identify whether there is a NACK feedback signal.

In a second feedback model, all the receiving ends in the multicast packet feed back the HARQ results through different resources regardless of the HARQ results, that is regardless of whether the HARQ result is an ACK (Acknowledgment) or a NACK.

If different receiving ends feed back the respective HARQ results through a frequency division multiplexing manner, the accuracy that the transmitting ends receives the feedback signals is reduced since the HARQ results reach the transmitting end at different times.

Therefore, embodiments of the disclosure provide a method and a device for adjusting transmission time, which will be described below. With the method for adjusting transmission time according to embodiments of the disclosure, the physical sidelink feedback channels transmitted by different receiving ends in the same multicast packet can reach the transmitting end at the same time after different transmission delays, thereby improving the reliability of the sidelink multicast communication.

Embodiments of the disclosure provide a method for adjusting transmission time. The method can be applied to any one of receiving ends in the sidelink multicast communication. The method can include the following.

In block 101, physical sidelink feedback channel is sent at a target timing that is before a synchronization reference timing and separated from the synchronization reference timing in time by a first time offset.

In embodiments of the disclosure, the target timing is also called the first timing, and the term "target timing" and the term "first timing" can be used interchangeably. The synchronization reference timing is a reference timing that the receiving ends send sidelink signals.

Optionally, the synchronization reference timing may be a timing from a GNSS (Global Navigation Satellite System), such as a GPS (Global Positioning System) signal, or the reference synchronization timing may be a timing that a base station transmits a downlink synchronization signal, such as a PSS (Primary Synchronization Signal) or an SSS (Secondary Synchronization Signal), or the reference synchronization timing may be a synchronization timing of an SLSS (Sidelink Synchronization Signal) provided by other UEs (user equipment), such as a transmitting end or other receiving ends. The reference synchronization timing can also come from a crystal oscillator timing of the user equipment itself. In embodiments of the disclosure, the receiving end can select one of the foregoing as its own synchronization reference timing in accordance with provisions of protocols. It can be understood, the term "reference synchronization signal" and the term "synchronization reference signal" can be used interchangeably.

Optionally, the first time offset may be a positive integer multiple of $T_C$.

$T_C$ is the minimum time unit of signal processing in NR, as shown in formula 1:

$$T_C = 1/(\Delta f_{max} \times N_f) \qquad \text{Formula 1}$$

where, $\Delta f_{max} = 480 \times 10^3$ Hz, and $N_f = 4096$.

Optionally, the receiving ends feed back the HARQ results indicating whether sidelink data transmitted by the transmitting end is successfully received through the physical sidelink feedback channel.

In this block, the receiving end does not send the physical sidelink feedback channel to the transmitting end according to the synchronization reference timing but advances the synchronization reference timing according to the respective first time offset. That is, the physical sidelink feedback channels are transmitted to the transmitting end according to respective target timings.

Optionally, only when the HARQ result is a NACK, the receiving end provides the feedback and starts transmitting the physical sidelink feedback channel to the transmitting end at the target timing corresponding to itself. When the HARQ result is an ACK, the receiving end does not provide the feedback. Different receiving ends provide the NACK feedbacks with the same feedback resource, and the data transmitting end receives mixed feedback signals from all receiving ends.

Figures 2, 3:
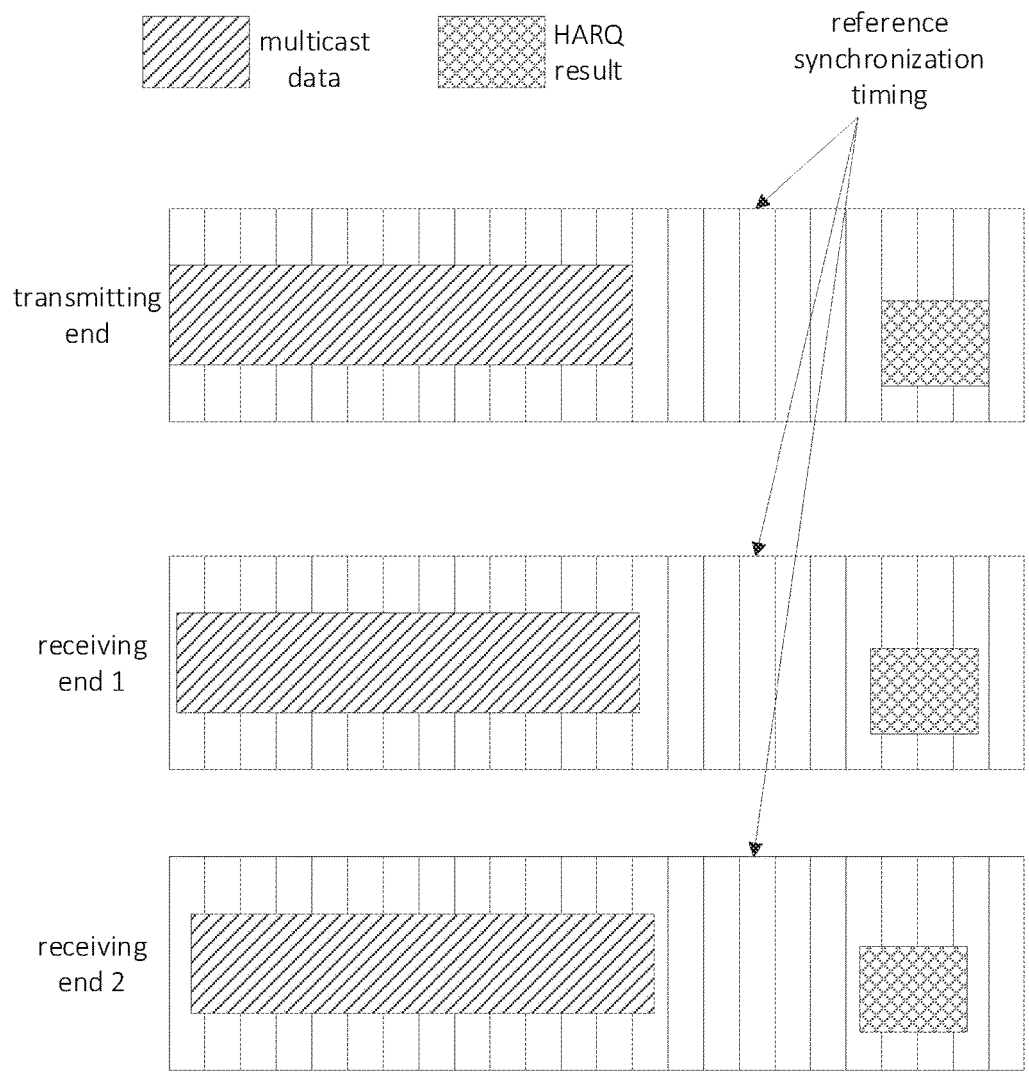
FIG. 2 is a schematic diagram illustrating a scenario of a method for adjusting transmission time according to an example embodiment.
FIG. 3 is a schematic diagram illustrating a method for adjusting transmission time according to an example embodiment.

For example, as illustrated in FIG. 2, if there is at least one receiving end that does not successfully receive the multicast communication, the transmitting end may simultaneously receive the physical sidelink feedback channel sent by at least one receiving end in the multicast packet.

In above embodiments, different receiving ends can differently advance the timings according to their respective signal propagation delays, i.e., use different target timings, such that the feedback signals sent by different receiving ends can reach the transmitting end at the same time, thereby avoiding a problem that different signals in the mixed signals cancel out each other due to phase rotation caused by different signal propagation delays, greatly reducing a time difference between the time that the physical sidelink feedback channels sent by different receiving ends in the same multicast packet reach the transmitting end, and improving the reliability of sidelink multicast communication.

In an embodiment, the receiving end feeds back the ACK when the HARQ result is an ACK and feeds back the NACK when the HARQ result is a NACK, and different receiving ends use different feedback resources to provide the feedbacks. The data sending end receives the feedbacks sent by different receiving ends respectively.

In the above embodiments, different receiving ends can advance the timings according to their respective signal propagation delays. That is, the different receiving ends use different target timings. Therefore, the feedback signals sent by different receiving ends can reach the transmitting end at the same time. In this way, when different receiving ends transmit the feedbacks with the feedback resource of the frequency-domain orthogonal multiplexing manner or the feedback resource of code-domain orthogonal multiplexing, decrease of the orthogonality due to different signal propagation delays is avoided and the reliability of the sidelink multicast communication can also be improved.

In an embodiment, the receiving end may determine the first time offset based on a second time offset value between a second timing obtained based on received sidelink signal transmitted by the transmitting end and the synchronization reference timing.

FIG. 3 is a flowchart illustrating another method for adjusting transmission time according to an embodiment. As illustrated in FIG. 3, the block 101 may include the following.

In block 101-11, the second time offset between the second timing when the sidelink signal transmitted by the transmitting end is received and the synchronization reference timing is determined.

Here, the timing can be any one of symbol timing, slot timing, subframe timing, or frame timing. The second time offset may be less than an OFDM symbol length, such as an integer multiple of the value of $T_C$.

In this block, optionally, the receiving end can determine the second timing when the receiving end receives the sidelink signal transmitted by the transmitting end by detecting a time domain resource where a CP (Cyclic Prefix) of the OFDM symbol of the sidelink signal transmitted by the transmitting end. Optionally, the sidelink signal transmitted by the transmitting end may be multicast data.

Further, the receiving end may determine the second time offset between the synchronization reference timing and the second timing.

In block 101-12, the first time offset is determined based on the second time offset.

Optionally, the receiving end can obtain the first time offset by adding a fixed time offset to the second time offset, or the receiving end can determine the first time offset that is positively proportional to the first time offset or has other functional relationship with the first time offset, which is not limited in the disclosure.

In foregoing embodiments, the receiving end may determine the first time offset based on the second time offset between the second timing that the transmitting end transmits the sidelink signal and the synchronization reference timing, which is implemented easily and has high availability.

In an embodiment, the receiving end may determine the first time offset based on a distance between the geographic location of the receiving end and the geographic location of the transmitting end.

Figure 4:
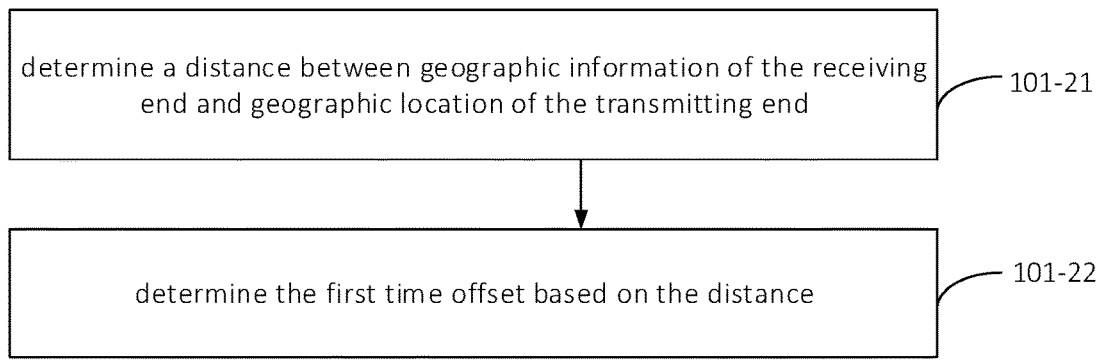
FIG. 4 is a schematic diagram illustrating another method for adjusting transmission time according to an example embodiment.

FIG. 4 is a flowchart illustrating another method for adjusting transmission time according to an embodiment. As illustrated in FIG. 4, the block 101 may include the following.

In block 101-21, the distance between the geographic location of the receiving end and the geographic location of the transmitting end is determined.

Optionally, the receiving end may calculate the distance based on first geographic location information of the transmitting end and second geographic location information where the receiving end is located.

In block 101-22, the first time offset is determined based on the distance.

In embodiments of the disclosure, the receiving end may determine the first time offset as shown in formula 2:

$$\text{the first time offset } d=(c_1 \times s/v)+c_2 \quad \text{formula 2}$$

where, $c_1$ and $c_2$ are constants, s is the distance between the receiving end and the transmitting end, and v is the speed of light.

In foregoing embodiments, the receiving end can also determine the first time offset based on the distance between itself and the transmitting end. The larger the distance, the larger the first time offset is. Therefore, it can ensure that the transmitting end receives the physical sidelink feedback channels transmitted by the receiving ends apart from the transmitting end by different distances at almost the same time, thereby improving the reliability of the sidelink multicast communication.

Figure 5:
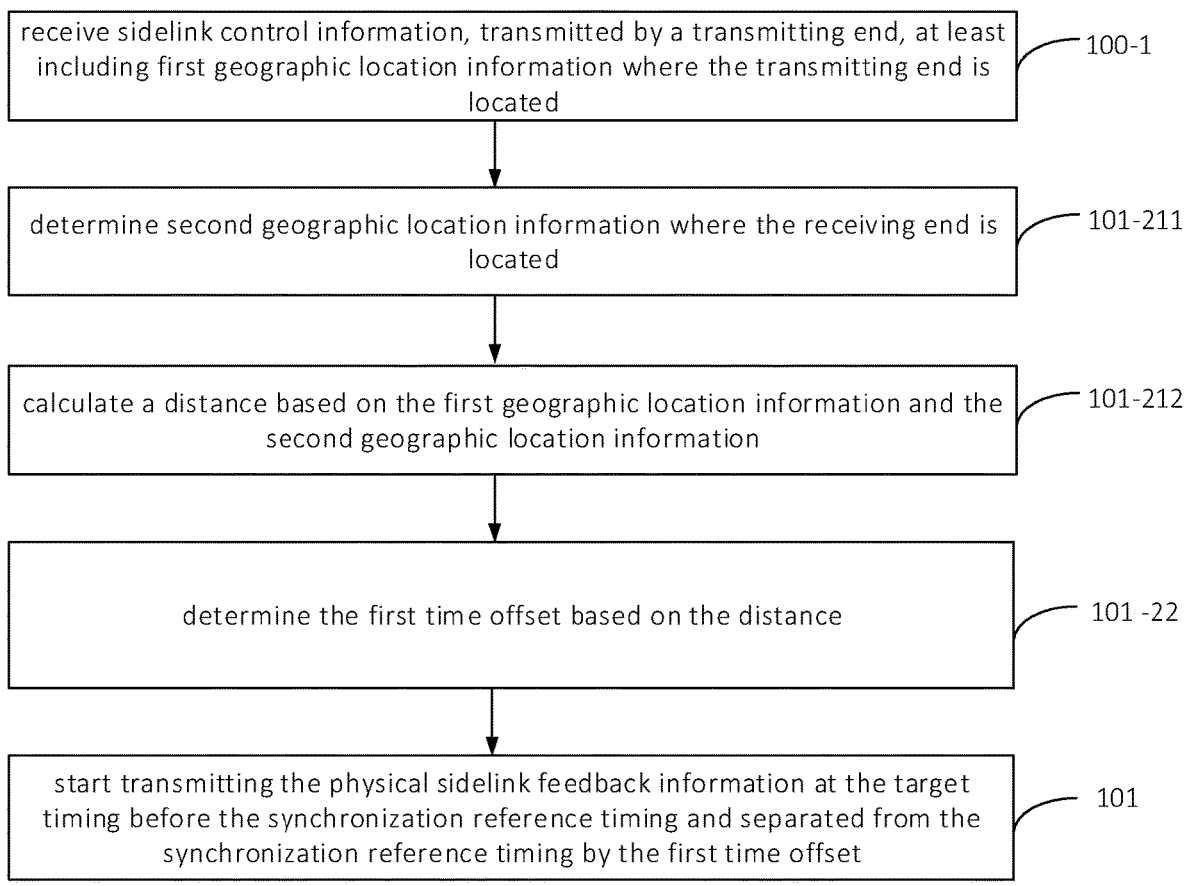
FIG. 5 is a schematic diagram illustrating another method for adjusting transmission time according to an example embodiment.

In an embodiment, FIG. 5 is a flowchart illustrating another method for adjusting transmission time according to embodiments of FIG. 4. As illustrated in FIG. 5, the above method may further include the following.

In block 100-1, sidelink control information, transmitted by the transmitting end, at least including the first geographic location information where the transmitting end is located is received.

In this block, the transmitting end can transmit the first geographic location information where the transmitting end is located to all receiving ends in the multicast packet through the sidelink control information.

Correspondingly, the above blocks 101-21 may include the following.

In blocks 101-211, second geographic location information where the receiving end is located is determined.

In this block, the receiving end can determine its own second geographic location information through a pre-installed GPS.

In blocks 101-212, the distance is calculated based on the first geographic location information and the second geographic location information.

In this block, the receiving end has received the first geographic location information transmitted by the transmitting end in advance, and the receiving end can directly calculate the distance between the transmitting end and the receiving end based on the first geographic location information and the second geographic location information.

In foregoing embodiments, the transmitting end can transmit the first geographic location information of the transmitting end to the receiving end through the sidelink control information. The receiving end can calculate the distance between itself and the transmitting end based on the second geographic location information where the receiving end is located and the first geographic location information, which has high availability.

Figure 6:
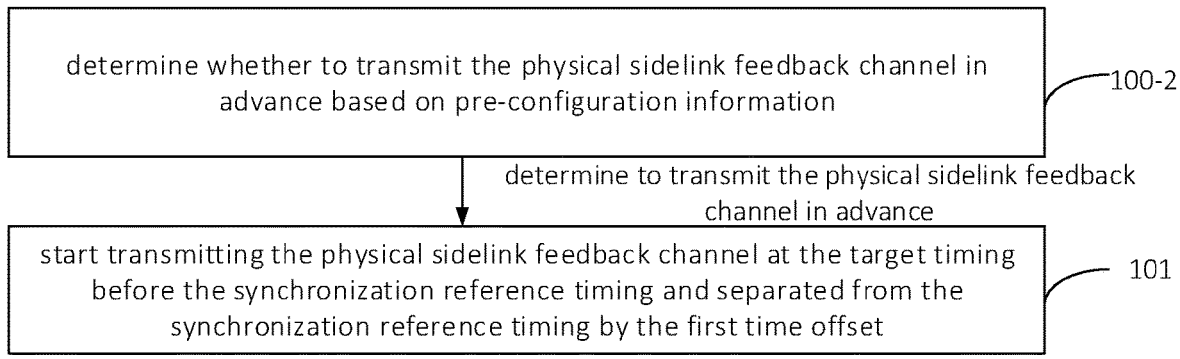
FIG. 6 is a schematic diagram illustrating another method for adjusting transmission time according to an example embodiment.

FIG. 6 is a flowchart illustrating another method for adjusting transmission time according to an embodiment. In an embodiment, as illustrated in FIG. 6, before performing the block 101, the above method may further include the following.

In block 100-2, it is determined whether to transmit the physical sidelink feedback channel in advance based on pre-configuration information.

For example, the pre-configuration information that has been pre-configured in the device hardware when the receiving end leaves the factory indicates that the physical sidelink feedback channel needs to be transmitted in advance, the receiving end can continue to perform the above block 101, i.e., start transmitting the physical sidelink feedback channel at the target timing.

In foregoing embodiments, the receiving end can determine whether to transmit the physical sidelink feedback channel in advance according to its own pre-configuration information, such that the process of the sidelink multicast communication is flexible.

Figure 7:
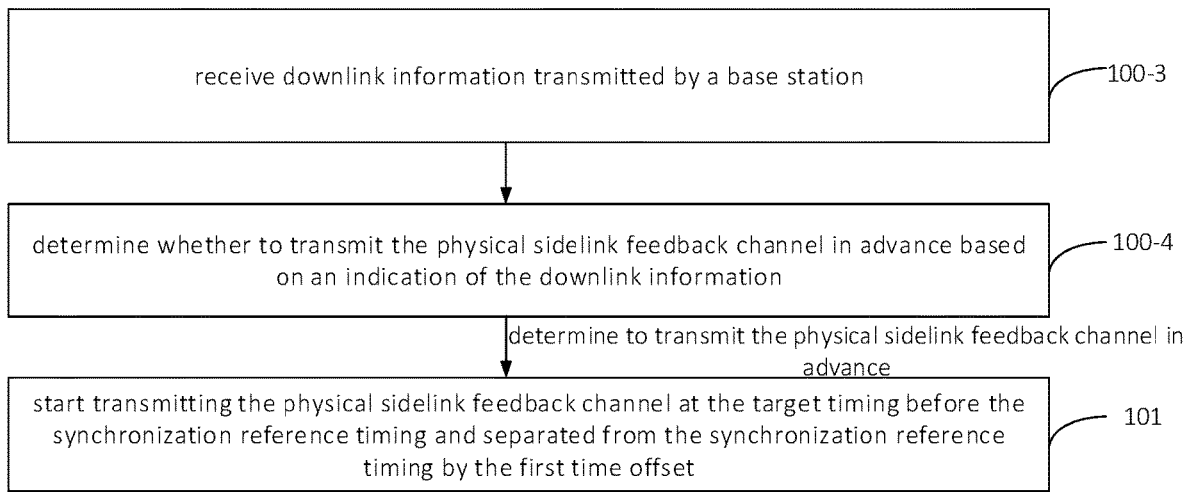
FIG. 7 is a schematic diagram illustrating another method for adjusting transmission time according to an example embodiment.

FIG. 7 is a flowchart illustrating another method for adjusting transmission time according to an embodiment. In an embodiment, as illustrated in FIG. 7, before performing the block 101, the above method may further include the following.

In block 100-3, downlink information transmitted by the base station is received.

Optionally, the downlink information includes, but is not limited to, a system message broadcast by the base station, or an RRC (Radio Resource Control) signaling transmitted by the base station for a designated receiving end, such as all the receiving ends in the multicast packet, or an MAC (Media Access Control Address) signaling, or a physical control signaling.

In block 100-4, it is determined whether to transmit the physical sidelink feedback channel in advance based on the indication of the downlink information.

In this block, the receiving end determines whether to transmit the physical sidelink feedback channel in advance based on the indication of the downlink information transmitted by the base station.

If the base station instructs the receiving end to transmit the physical sidelink feedback channel in advance through the downlink information, the receiving end can start transmitting the physical sidelink feedback channel at the target timing through the block 101.

In foregoing embodiments, the receiving end can also determine whether to transmit the physical sidelink feedback channel in advance according to the indication of the downlink information sent by the base station, which also makes the process of the sidelink multicast communication flexible.

Figure 8:
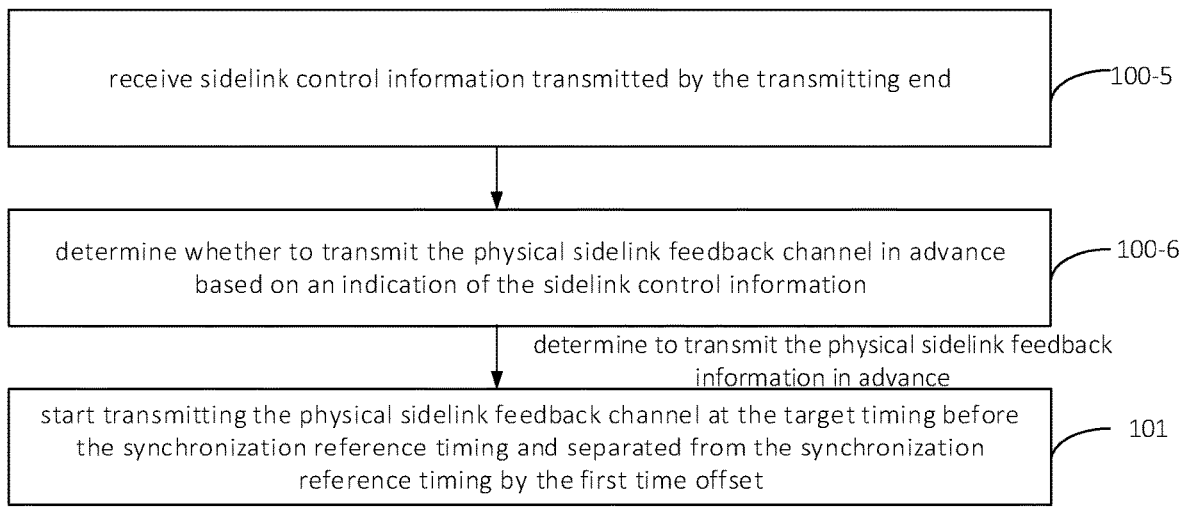
FIG. 8 is a schematic diagram illustrating another method for adjusting transmission time according to an example embodiment.

FIG. 8 is a flowchart illustrating another method for adjusting transmission time according to an embodiment. In an embodiment, as illustrated in FIG. 8, before performing the block 101, the above method may further include the following.

In block 100-5, the sidelink control information transmitted by the transmitting end is received.

In embodiments of the disclosure, optionally, the transmitting end may also indicate in the sidelink control information whether the receiving end transmits the physical sidelink feedback channel in advance.

The above blocks 100-1 and 100-5 can be combined as a single block. That is, the transmitting end can indicate whether the receiving end transmits the physical sidelink feedback channel in advance through the sidelink control information, in additional to the first geographic location information of the transmitting end.

In block 100-6, it is determined whether to transmit the physical sidelink feedback channel in advance based on the indication of the sidelink control information.

After receiving the sidelink control information transmitted by the transmitting end, the receiving end determines whether to transmit the physical sidelink feedback channel in advance based on the indication of the sidelink control information.

If the transmitting end instructs the receiving end to transmit the physical sidelink feedback channel in advance through the sidelink control information, the receiving end can start transmitting the physical sidelink feedback channel at the target timing through the block 101.

In foregoing embodiments, the receiving end can also determine whether to transmit the physical sidelink feedback channel in advance according to the indication of the sidelink control information transmitted by the transmitting end, which also makes the process of the sidelink multicast communication flexible and has high availability.

Figure 9:
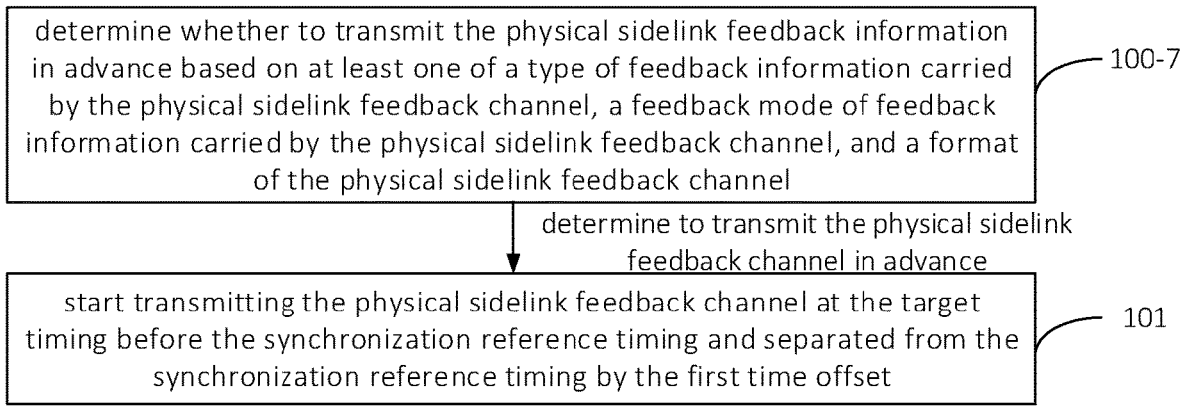
FIG. 9 is a schematic diagram illustrating another method for adjusting transmission time according to an example embodiment.

FIG. 9 is a flowchart illustrating another method for adjusting transmission time according to an embodiment. In an embodiment, as illustrated in FIG. 9, before performing the block 101, the above method may further include the following.

In block 100-7, it is determined whether to transmit the physical sidelink feedback channel based on at least one of a type of feedback information carried by the physical sidelink feedback channel, a feedback mode of the feedback information carried by the physical sidelink feedback channel, and a format of the physical sidelink feedback channel.

The type of feedback information carried by the physical sidelink feedback channel may be the HARQ result or channel quality information.

The feedback mode of the feedback information carried by the physical sidelink feedback channel can be the above-mentioned first feedback mode, for example, the feedback is only provided only when the HARQ result is the NACK, or the above-mentioned second feedback mode, for example, regardless of the HARQ result being the NACK or the ACK.

The format of the physical sidelink feedback channel is the format of the PSFCH (Physical Sidelink Feedback Channel). Optionally, the format of the physical sidelink feedback channel can be a format based on a sequential feedback or a format based on transmission modulation symbols.

In this block, for determining, by the receiving end, whether to transmit the physical sidelink feedback channel in advance based on the type of feedback information carried by the physical sidelink feedback channel, the type of the feedback information may be preset. For example, the preset type can be that the HARQ result is the NACK. When the HARQ result is the NACK, it is determined to transmit the physical sidelink feedback channel in advance.

For determining, by the receiving end, whether to transmit the physical sidelink feedback channel in advance based on the feedback mode of the feedback information carried by the physical sidelink feedback channel, the feedback mode may be a preset feedback mode. For example, when the preset feedback mode is the above-mentioned first feedback mode, it is determined to transmit the physical sidelink feedback channel in advance.

For determining, by the receiving end, whether to transmit the physical sidelink feedback channel in advance based on the format of the physical sidelink feedback channel, it can be determined to transmit the physical sidelink feedback channel in advance when the PSFCH is the preset mode, such as the preset mode is the format based on sequential feedback.

After the receiving end determines to transmit the physical sidelink feedback channel in advance using at least one of the above manners, the block 101 of starting to transmit the physical sidelink feedback channel at the target timing can be executed.

In foregoing embodiments, the receiving end may also determine whether to transmit the physical sidelink feedback channel in advance based on at least one of the type of the feedback information carried by the physical sidelink feedback channel, the feedback mode of the feedback information carried by the physical sidelink feedback channel, and the format of the physical sidelink feedback channel, which also makes the process of the sidelink multicast communication flexible and has high availability.

For foregoing method embodiments, for the sake of simple description, they are all expressed as a series of action combinations, but those skilled in the art should know that the disclosure is not limited by the described sequence of actions, because based on the disclosure, certain steps can be performed in other order or simultaneously. Secondly, those skilled in the art should also know that the embodiments described in the specification are all optional embodiments, and the involved actions and modules are not necessarily required by the disclosure.

Corresponding to the foregoing application function realization method embodiments, the disclosure also provides embodiments of an application function realization apparatus.

Figure 10:
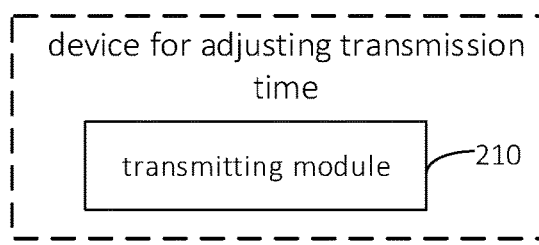
FIG. 10 is a block diagram illustrating a device for adjusting transmission time according to an example embodiment.

FIG. 10 is a block diagram illustrating a device for adjusting transmission time according to an example embodiment. As illustrated in FIG. 10, the device is used in any one of receiving ends in a sidelink multicast communication. The device includes a transmitting module 210.

The transmitting module 210 is configured to start transmitting the physical sidelink feedback channel at a target timing before a synchronization reference time and separated from the synchronization reference timing by a first time offset.

Figure 11:
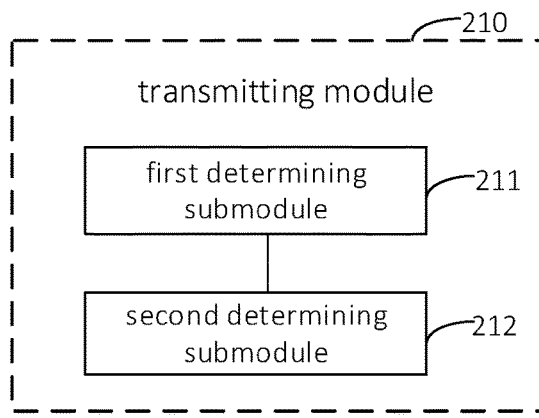
FIG. 11 is a block diagram illustrating another device for adjusting transmission time according to an example embodiment.

FIG. 11 is a block diagram illustrating another device for adjusting transmission time based on embodiments of FIG. 10. As illustrated in FIG. 11, the transmitting module 210 includes a first determining submodule 211 and a second determining submodule 212.

The first determining submodule 211 is configured to determine a second time offset between the second timing when the sidelink signal transmitted by the transmitting end is received and the synchronization reference timing. The second determining submodule 212 is configured to determine the first time offset based on the second time offset.

Figure 12:
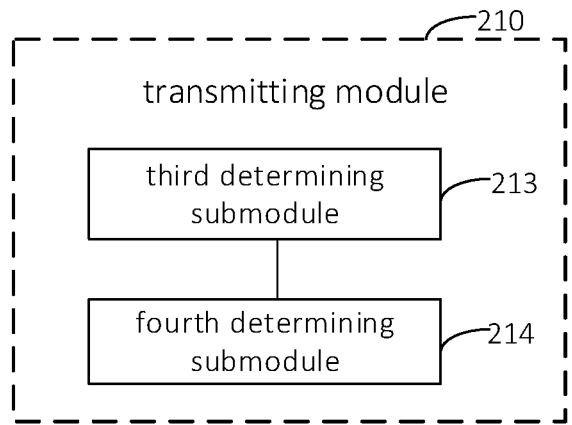
FIG. 12 is a block diagram illustrating another device for adjusting transmission time according to an example embodiment.

FIG. 12 is a block diagram illustrating another device for adjusting transmission time based on the embodiment of FIG. 10. As illustrated in FIG. 12, the transmitting module 210 includes a third determining submodule 213 and a fourth determining sub-module 214.

The third determining submodule 213 is configured to determine a distance between the geographic location of the receiving end and the geographic location of the transmitting end.

The fourth determining sub-module 214 is configured to determine the first time offset based on the distance.

Figure 13A:
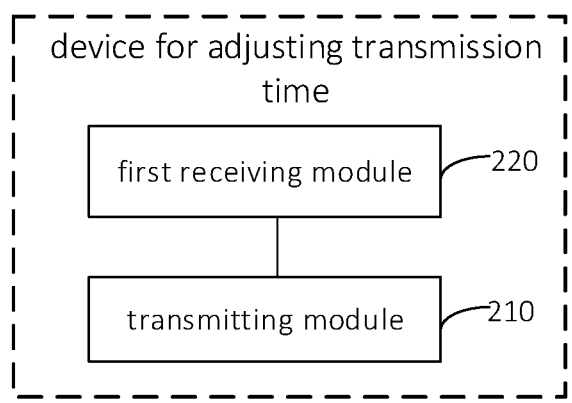
FIGS. 13A and 13B are block diagrams illustrating another device for adjusting transmission time according to an example embodiment.

FIG. 13A is a block diagram illustrating another device for adjusting transmission time based on embodiments of FIG. 12. As illustrated in FIG. 13A, the device further includes a first receiving module 220.

The first receiving module 220 is configured to receive sidelink control information, transmitted by the transmitting end, at least including first geographic location information where the transmitting end is located.

Figure 13B:
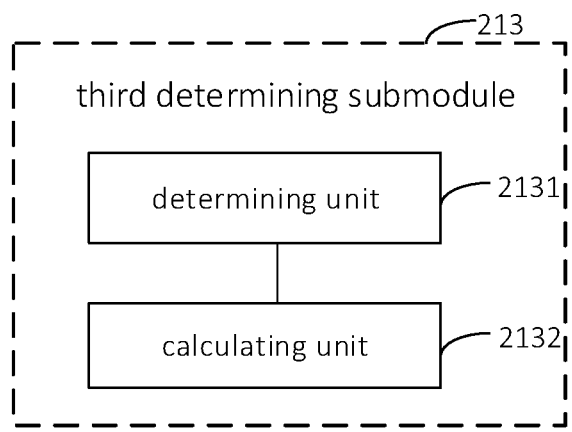

FIG. 13B is a block diagram illustrating another device for adjusting transmission time based on embodiments of FIG. 13A. As illustrated in FIG. 13B, the third determining submodule 213 includes a determining unit 2131 and a calculating unit 2132.

The determining unit 2131 is configured to determine second geographic location information where the receiving end is located.

The calculating unit 2132 is configured to calculate the distance based on the first geographic location information and the second geographic location information.

Figure 14:
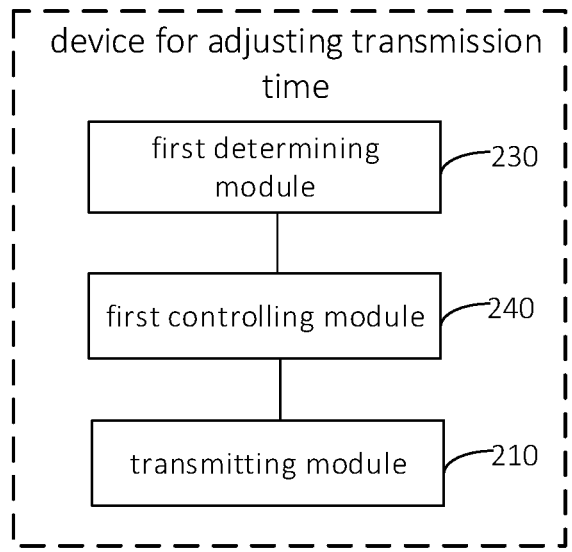
FIG. 14 is a block diagram illustrating another device for adjusting transmission time according to an example embodiment.

FIG. 14 is a block diagram illustrating another device for adjusting transmission time based on embodiments of FIG. 10. As illustrated in FIG. 10, the device further includes a first determining module 230 and a first controlling module 240.

The first determining module 230 is configured to determine whether to transmit the physical sidelink feedback channel in advance based on the pre-configuration information.

The first controlling module 240 is configured to control the transmitting module 210 to start transmitting the physical sidelink feedback channel at the target timing before the synchronization reference timing and separated from the synchronization reference timing by a first time offset if determining to transmit the physical sidelink feedback channel based on the pre-configuration information.

Figure 15:
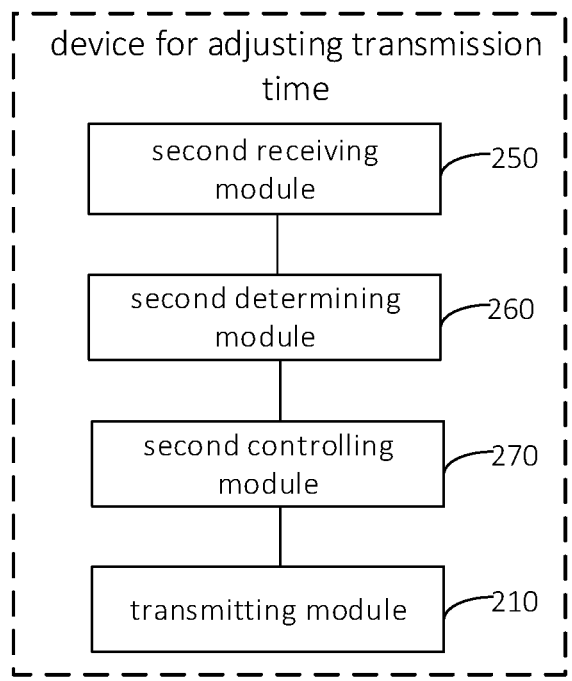
FIG. 15 is a block diagram illustrating another device for adjusting transmission time according to an example embodiment.

FIG. 15 is a block diagram illustrating another device for adjusting transmission time based on embodiments of FIG. 10. As illustrated in FIG. 15, the device further includes: a second receiving module 250, a second determining module 260, and a second controlling module 270.

The second receiving module 250 is configured to receive downlink information transmitted by a base station.

The second determining module 260 is configured to determine whether to transmit the physical sidelink feedback channel in advance based on an indication of the downlink information.

The second controlling module 270 is configured to control the transmitting module 210 to start transmitting the physical sidelink feedback channel at the target timing before the synchronization reference timing and separated from the synchronization reference timing by the first time offset if determining to transmit the physical sidelink feedback channel in advance based on the indication of the downlink information.

Figure 16:
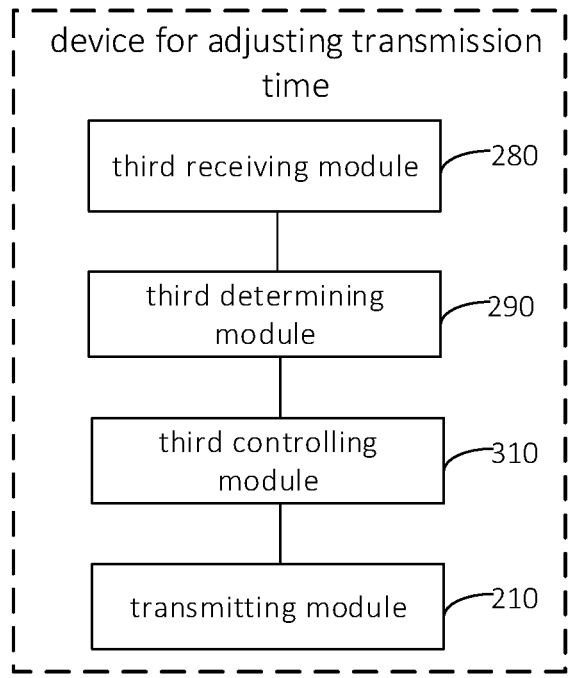
FIG. 16 is a block diagram illustrating another device for adjusting transmission time according to an example embodiment.

FIG. 16 is a block diagram illustrating another device for adjusting transmission time based on embodiments of FIG. 10. As illustrated in FIG. 16, the device further includes a third receiving module 280, a third determining module 290, and a third controlling module 310.

The third receiving module 280 is configured to receive sidelink control information transmitted by the transmitting end.

The third determining module 290 is configured to determine whether to transmit the physical sidelink feedback channel in advance based on an indication of the sidelink control information.

The third controlling module 310 is configured to control the transmitting module 210 to start transmitting the physical sidelink feedback channel at the target timing before the synchronization referent timing and separated from the synchronization reference timing by the first time offset if determining to transmit the physical sidelink feedback channel in advance based on the indication of the sidelink control information.

Figure 17:
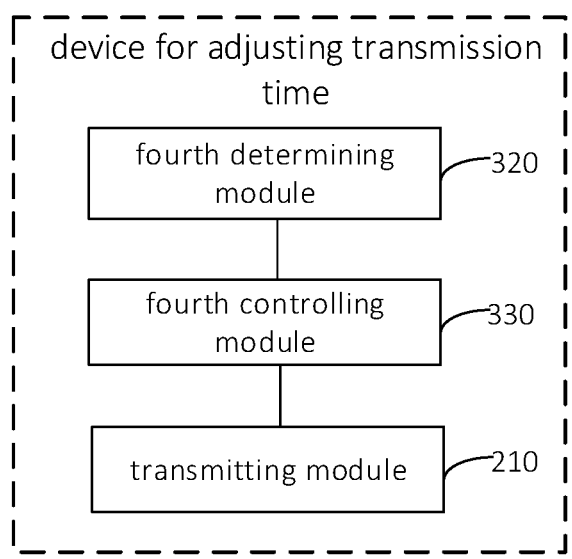
FIG. 17 is a block diagram illustrating another device for adjusting transmission time according to an example embodiment.

FIG. 17 is a block diagram illustrating another device for adjusting transmission time based on embodiments of FIG. 10. As illustrated in FIG. 17, the device further includes a fourth determining module 320 and a fourth controlling module 330.

The fourth determining module 320 is configured to determine whether the transmit the physical sidelink feedback channel in advance based on at least one of a type of feedback information carried by the physical sidelink feedback channel, a feedback mode of the feedback information carried by the physical sidelink feedback channel, and a format of the physical sidelink feedback channel.

The fourth controlling module 330 is configured to start transmitting the physical sidelink feedback channel at the target timing before the synchronization reference timing and separated from the synchronization reference timing by the first time offset if determining to transmit the physical sidelink feedback channel in advance.

For device embodiments, since they basically correspond to the method embodiments, the relevant part can refer to the part of the description of the method embodiments. The device embodiments described above are merely illustrative. The units described above as separate components may or may not be physically separated, and the components displayed as units may or may not be physical units, that is, they may be integrated or distributed to multiple network units. Some or all of the modules can be selected according to actual needs to achieve the objectives of the solutions of the disclosure. Those of ordinary skill in the art can understand and implement the disclosure without creative work.

Correspondingly, the disclosure also provides a computer-readable storage medium. The storage medium has a computer program stored thereon. The computer program is configured to execute any one of the above-mentioned methods for adjusting transmission time adjustments executed by the receiving end.

Correspondingly, the disclosure also provides a device for adjusting transmission time. The device is used for any one of receiving ends in a sidelink multicast communication. The device includes a processor and a memory for storing an instruction executable by the processor.

The processor is configured to start transmitting the physical sidelink feedback channel at a target timing before a synchronization reference timing and separated from the synchronization reference timing by a first time offset.

The synchronization reference timing is a reference timing that the receiving end transmits a sidelink signal.

With embodiments of the disclosure, any one of receiving ends in the sidelink multicast communication can start transmitting the physical sidelink feedback channel at the target timing. The target timing is before the synchronization reference timing and is separated from the synchronization reference timing by the first time offset. In embodiments of the disclosure, the receiving end may not start transmitting the physical sidelink feedback channel at the synchronization reference timing, but start transmitting the physical sidelink feedback channel at the target timing in advance. In the above process, different receiving ends can correspond to different target timings, such that the transmitting end can receive the physical sidelink feedback channels transmitted by different receiving ends in the same multicast packet at the same time, which greatly reduces a time difference between the time that the physical sidelink feedback channels sent by different receiving ends in the same multicast packet reach the transmitting end, and improves the reliability of sidelink multicast communication.

In embodiments of the disclosure, optionally, the receiving end may determine the first time offset by determining the second time offset between the second timing that the sidelink signal transmitted by the transmitting end is received and the synchronization reference timing, which is easy to implement and has high availability.

In embodiments of the disclosure, optionally, the receiving end can also determine the first time offset based on the distance value between the geographic location of the receiving end and the geographic location of the transmitting end, which is easy to implement and has high availability.

In embodiments of the disclosure, the transmitting end can send the first geographic location information of the transmitting end to the receiving end through the sidelink control information, and the receiving end can calculate the distance between the receiving end and the transmitting end based on the second geographic location information of the receiving end and the first geographic location information, which has high availability.

In embodiments of the disclosure, the receiving end may first determine whether to transmit the physical sidelink feedback channel in advance based on its own pre-configuration information and start transmitting the physical sidelink feedback channel at the target timing after determining to transmit the physical sidelink feedback channel in advance. Through the above process, the receiving end can determine whether to transmit the physical sidelink feedback channel in advance according to its own pre-configuration information, making the process of sidelink multicast communication flexible.

In embodiments of the disclosure, the receiving end can also determine whether to transmit the physical sidelink feedback channel in advance according to the indication of the downlink information transmitted by the base station, which also makes the process of the sidelink multicast communication flexible.

In embodiments of the disclosure, the receiving end can also determine whether to transmit the physical sidelink feedback channel in advance according to the indication of the sidelink control information transmitted by the transmitting end, which also makes the process of the sidelink multicast communication flexible and has high availability.

In embodiments of the disclosure, the receiving end may also determine whether to transmit the physical sidelink feedback channel in advance based on at least one of the type of feedback information carried by the physical sidelink feedback channel, the feedback mode of the feedback information carried by the physical sidelink feedback channel, and the format of the physical sidelink feedback channel, which also makes the process of the sidelink multicast communication flexible and has high availability.

Figure 18:
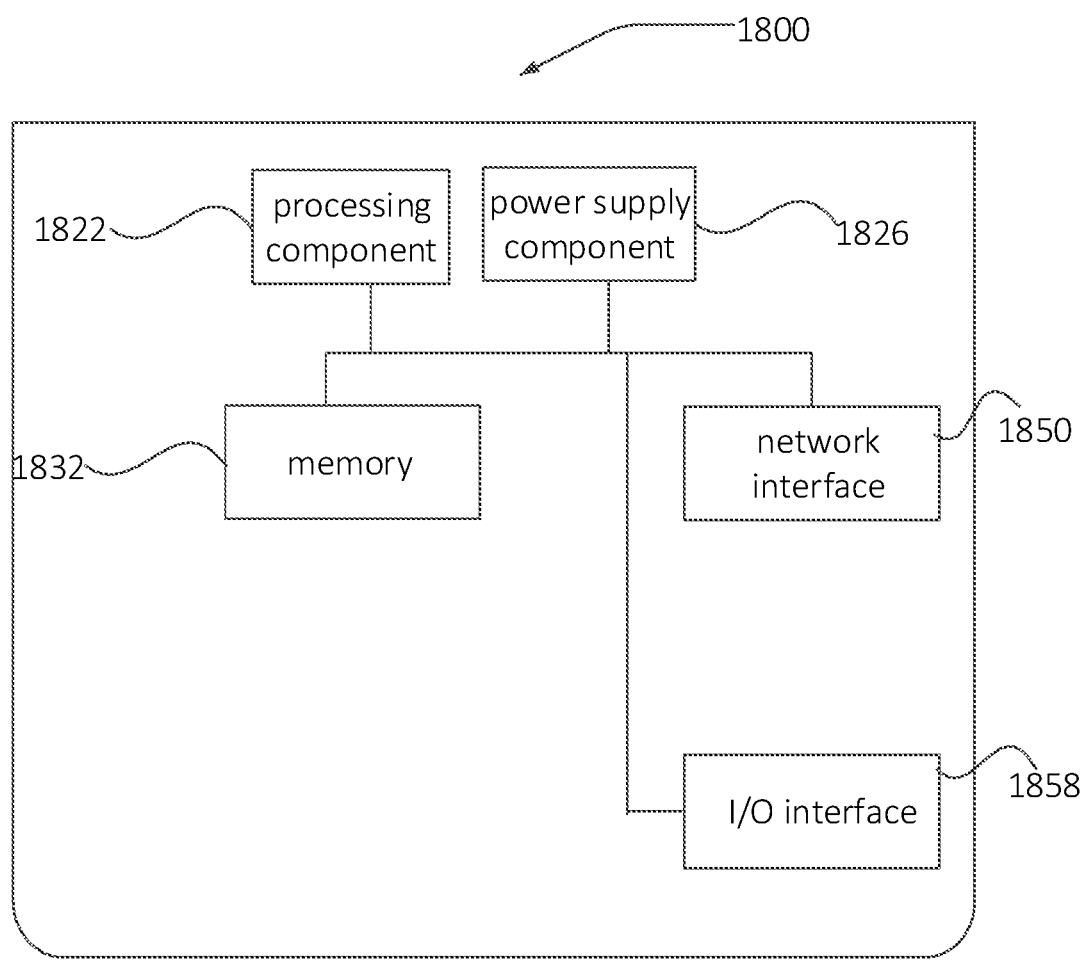
FIG. 18 is a schematic structural diagram illustrating a device for adjusting transmission time according to an example embodiment of the disclosure.

FIG. 18 is a schematic structural diagram illustrating a device 1800 for adjusting transmission time according to an example embodiment. For example, the device 1800 may be provided as a receiving end, such as a vehicle-mounted device, a handheld device, and the like. As illustrated in FIG. 18, the device 1800 includes a processing component 1822 which further includes one or more processors, and a memory resource represented by a memory 1832 for storing instructions executable by the processing component 1822, such as application programs. The application programs stored in the memory 1832 may include one or more modules each corresponding to a set of instructions. In addition, the processing component 1822 is configured to execute instructions to execute the above-mentioned method for adjusting transmission time.

The device 1800 may also include a power supply component 1826 configured to perform power management of the device 1800, a wired or wireless network interface 1850 configured to connect the device 1800 to the network, and an input output (I/O) interface 1858. The device 1800 can operate based on an operating system stored in the memory 1832, such as Android, IOS, Windows Server™, Mac OS X™, Unix™, Linux™, FreeBSD™ or the like.

When the instructions in the memory 1832 are executed by the processing component 1822, the device 1800 is enabled to execute the foregoing method for adjusting transmission time.

After considering the specification and practicing the disclosure disclosed herein, those skilled in the art will easily think of other embodiments of the disclosure. The disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The description and the embodiments are to be regarded as exemplary only, and the true scope and spirit of the disclosure are pointed out by the following claims.

It is to be understood that the disclosure is not limited to the precise structure that has been described above and shown in the drawings, and various modifications and changes can be made without departing from its scope. The scope of the disclosure is only limited by the appended claims.

What is claimed is:

1. A method for adjusting transmission time, executed by any one of receiving ends in a sidelink multicast communication, the method comprising:
   starting transmitting a physical sidelink feedback channel at a first timing before a synchronization reference timing and separated from the synchronization reference timing by a first time offset;
   before starting transmitting the physical sidelink feedback channel at the first timing before the synchronization reference timing and separated from the synchronization reference timing by the first time offset, further comprising:
   determining whether to transmit the physical sidelink feedback channel in advance based on at least one of a type of feedback information carried by the physical sidelink feedback channel, a feedback mode of feedback information carried by the physical sidelink feedback channel, and a format of the physical sidelink feedback channel;
   starting transmitting the physical sidelink feedback channel at the first timing before the synchronization reference timing and separated from the synchronization reference timing by the first time offset, in response to determining to transmit the physical sidelink feedback channel in advance.

2. The method of claim 1, wherein the first time offset is determined by:
   determining a second time offset between a second timing that a sidelink signal transmitted by a transmitting end is received and the synchronization reference timing; and
   determining the first time offset based on the second time offset.

3. The method of claim 1, wherein the first time offset is determined by:
   determining a distance between a geographic location of the receiving end and a geographic location of a transmitting end; and
   determining the first time offset based on the distance between geographic locations.

4. The method of claim 3, further comprising:
   receiving sidelink control information, transmitted by the transmitting end, at least comprising first geographic location information where the transmitting end is located;
   wherein determining the distance between the geographic location of the receiving end and the geographic location of the transmitting end comprises:
   determining second geographic location information where the receiving end is located; and
   calculating the distance based on the first geographic location information and the second geographic location information.

5. The method of claim 1, before starting transmitting the physical sidelink feedback channel at the first timing before the synchronization reference timing and separated from the synchronization reference timing by the first time offset, further comprising:
   determining whether to transmit the physical sidelink feedback channel based on pre-configuration information; and
   starting transmitting the physical sidelink feedback channel at the first timing before the synchronization reference timing and separated from the synchronization reference timing by the first time offset, in response to determining to transmit the physical sidelink feedback channel in advance based on the pre-configuration information.

6. The method of claim 1, before starting transmitting the physical sidelink feedback channel at the first timing before the synchronization reference timing and separated from the synchronization reference timing by the first time offset, further comprising:
   receiving downlink information transmitted by a base station;
   determining whether to transmit the physical sidelink feedback channel in advance based on an indication of the downlink information; and
   starting transmitting the physical sidelink feedback channel at the first timing before the synchronization reference timing and separated from the synchronization reference timing by the first time offset, in response to determining to transmit the physical sidelink feedback channel in advance based on an indication of the downlink information.

7. The method of claim 1, before starting transmitting the physical sidelink feedback channel at the first timing before the synchronization reference timing and separated from the synchronization reference timing by the first time offset, further comprising:
receiving sidelink control information transmitted by a transmitting end;
determining whether to transmit the physical sidelink feedback channel based on an indication of the sidelink control information; and
starting transmitting the physical sidelink feedback channel at the first timing before the synchronization reference timing and separated from the synchronization reference timing by the first time offset, in response to determining to transmit the physical sidelink feedback channel in advance based on an indication of the sidelink control information.

8. A non-transitory computer-readable storage medium, having computer instructions stored thereon, wherein the computer instructions are configured to execute a method for adjusting transmission time, the method comprising:
starting transmitting a physical sidelink feedback channel at a first timing before a synchronization reference timing and separated from the synchronization reference timing by a first time offset;
before starting transmitting the physical sidelink feedback channel at the first timing before the synchronization reference timing and separated from the synchronization reference timing by the first time offset, further comprising:
determining whether to transmit the physical sidelink feedback channel in advance based on at least one of a type of feedback information carried by the physical sidelink feedback channel, a feedback mode of feedback information carried by the physical sidelink feedback channel, and a format of the physical sidelink feedback channel;
starting transmitting the physical sidelink feedback channel at the first timing before the synchronization referent timing and separated from the synchronization reference timing by the first time offset, in response to determining to transmit the physical sidelink feedback channel in advance.

9. The non-transitory computer-readable storage medium of claim 8, wherein the first time offset is determined by:
determining a second time offset between a second timing that a sidelink signal transmitted by a transmitting end is received and the synchronization reference timing; and
determining the first time offset based on the second time offset.

10. The non-transitory computer-readable storage medium of claim 8, wherein the first time offset is determined by:
determining a distance between a geographic location of the receiving end and a geographic location of a transmitting end; and
determining the first time offset based on the distance between geographic locations.

11. The non-transitory computer-readable storage medium of claim 10, wherein the method further comprises:
receiving sidelink control information, transmitted by the transmitting end, at least comprising first geographic location information where the transmitting end is located;
wherein determining the distance between the geographic location of the receiving end and the geographic location of the transmitting end comprises:

determining second geographic location information where the receiving end is located; and
calculating the distance based on the first geographic location information and the second geographic location information.

12. A device for adjusting transmission time, integrated into any one of receiving ends in a sidelink multicast communication, the device comprising:
a processor, and
a memory, for storing instructions executable by the processor;
wherein the processor is configured to start transmitting a physical sidelink feedback channel at a first timing before a synchronization reference timing and separated from the synchronization reference timing by a first time offset;
before starting transmitting the physical sidelink feedback channel at the first timing before the synchronization reference timing and separated from the synchronization reference timing by the first time offset, the processor is configured to:
determine whether to transmit the physical sidelink feedback channel in advance based on at least one of a type of feedback information carried by the physical sidelink feedback channel, a feedback mode of feedback information carried by the physical sidelink feedback channel, and a format of the physical sidelink feedback channel;
start transmitting the physical sidelink feedback channel at the first timing before the synchronization referent timing and separated from the synchronization reference timing by the first time offset, in response to determining to transmit the physical sidelink feedback channel in advance.

13. The device of claim 12, wherein the first time offset is determined by:
determining a second time offset between a second timing that a sidelink signal transmitted by a transmitting end is received and the synchronization reference timing; and
determining the first time offset based on the second time offset.

14. The device of claim 12, wherein the first time offset is determined by:
determining a distance between a geographic location of the receiving end and a geographic location of a transmitting end; and
determining the first time offset based on the distance between geographic locations.

15. The device of claim 14, wherein the processor is further configured to:
receive sidelink control information, transmitted by the transmitting end, at least comprising first geographic location information where the transmitting end is located;
determine second geographic location information where the receiving end is located; and
calculate the distance based on the first geographic location information and the second geographic location information.

16. The device of claim 12, wherein the processor is further configured to:
determine whether to transmit the physical sidelink feedback channel based on pre-configuration information; and
start transmitting the physical sidelink feedback channel at the first timing before the synchronization reference timing and separated from the synchronization reference timing by the first time offset, in response to determining to transmit the physical sidelink feedback channel in advance based on the pre-configuration information.

17. The device of claim 12, wherein the processor is further configured to:

receive downlink information transmitted by a base station;

determine whether to transmit the physical sidelink feedback channel in advance based on an indication of the downlink information; and start transmitting the physical sidelink feedback channel at the first timing before the synchronization reference timing and separated from the synchronization reference timing by the first time offset, in response to determining to transmit the physical sidelink feedback channel in advance based on an indication of the downlink information.

18. The device of claim 12, wherein the processor is further configured to:

receive sidelink control information transmitted by a transmitting end;

determine whether to transmit the physical sidelink feedback channel based on an indication of the sidelink control information; and start transmitting the physical sidelink feedback channel at the first timing before the synchronization reference timing and separated from the synchronization reference timing by the first time offset, in response to determining to transmit the physical sidelink feedback channel in advance based on an indication of the sidelink control information.

* * * * *